(12) United States Patent
Couch et al.

(10) Patent No.: US 6,725,212 B2
(45) Date of Patent: Apr. 20, 2004

(54) PLATFORM-INDEPENDENT METHOD AND SYSTEM FOR GRAPHICALLY PRESENTING THE EVALUATION OF A QUERY IN A DATABASE MANAGEMENT SYSTEM

(75) Inventors: Tanya Couch, San Jose, CA (US); Stefan Bengt Edlund, San Jose, CA (US); George Lapis, San Jose, CA (US); Guy Maring Lohman, San Jose, CA (US); Berthold Reinwald, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 09/944,921

(22) Filed: Aug. 31, 2001

(65) Prior Publication Data

US 2003/0093410 A1 May 15, 2003

(51) Int. Cl.[7] .............................................. G06F 17/30
(52) U.S. Cl. ........................................ 707/2; 707/102
(58) Field of Search ................................... 707/2, 102

(56) References Cited

U.S. PATENT DOCUMENTS

| | | | |
|---|---|---|---|
| 5,412,804 A | * 5/1995 | Krishna ........................ 707/2 |
| 5,495,605 A | * 2/1996 | Cadot ............................ 707/4 |
| 5,546,576 A | * 8/1996 | Cochrane et al. .............. 707/2 |
| 5,671,403 A | * 9/1997 | Shekita et al. ................. 707/3 |
| 5,878,427 A | * 3/1999 | Waheed et al. ........ 707/103 R |
| 5,956,720 A | 9/1999 | Fernandez et al. ........... 707/10 |
| 5,963,934 A | * 10/1999 | Cochrane et al. .............. 707/2 |
| 5,995,961 A | 11/1999 | Levy et al. ..................... 707/4 |
| 6,092,062 A | * 7/2000 | Lohman et al. ................ 707/2 |
| 6,154,766 A | 11/2000 | Yost et al. ................... 709/201 |
| 6,449,620 B1 | * 9/2002 | Draper et al. ............... 707/102 |
| 6,546,381 B1 | * 4/2003 | Subramanian et al. ......... 707/2 |
| 6,654,734 B1 | * 11/2003 | Mani et al. ..................... 707/2 |
| 2003/0018832 A1 | * 1/2003 | Amirisetty et al. ......... 709/328 |

OTHER PUBLICATIONS

Shanmugasundaram et al, Relational Databases for Querying XML Documents: Limitations and Opportunities, Proc. 25th VLDB Conf., Edinburgh, Scotland (1999).*

Florescu et al, A Performance Evaluation of Alternative Mapping Schemes for Storing XML Data in a Relational Database, Rapport de Recherche No. 3680, INRIA, Rocquencourt, France (May 1999).*

McHugh, et al. "Query Optimization for XML," *Proceedings of the 25th VLDB Conference*, Edinburgh, Scotland, 1999, pp. 315–326.

* cited by examiner

Primary Examiner—Wayne Amsbury
(74) Attorney, Agent, or Firm—Sawyer Law Group LLC

(57) ABSTRACT

A method and system for graphically representing a plan for a query in a relational database management system is disclosed. The method includes receiving and processing an input query to form a plurality of plans, selecting at least one plan of the plurality of plans, and transforming the selected plan into a self-describing formatted file which is platform independent. The method further includes generating a graph representing the selected plan from the self-describing formatted file.

42 Claims, 32 Drawing Sheets

FIG. 5A

```
<!-- DTD for the XML input file to the Common Graphical Explain
     -->
<!-- Date last updated:    12/06/1999
     -->
<!--
     -->
<!-- REMINDER:        | = ALTERNATIVE     , = SEQUENCE
                      ? = OPTIONAL        * = 0, 1, . . . .
                      + = 1, . . . .
     -->
<!-- ***********************************************************
     -->
<!-- An EXPLAIN_REPORT consists of EXPLAIN data for one or more app
lications.  -->
<!-- Each report has a platform and a version attribute.
     -->
<!-- ***********************************************************
     -->
```

FIG. 5B

```
<! ELEMENT EXPLAIN_REPORT (APPLICATION_EXPLAIN_DATA) + >
<! ATTLIST EXPLAIN_REPORT PLATFORM (OS390 | AS400 | SQLDS | WORKSTAT
ION) #REQUIRED>
<! ATTLIST EXPLAIN_REPORT PRODUCT_VERSION CDATA #REQUIRED>
<! - - ****************************************************
      - - >
<! - - An application contains header information and EXPLAIN informa
tion for      - - >
<! - - one or more statements.
<! - - ****************************************************
      - - >
<! ELEMENT APPLICATION_EXPLAIN_DATA (
                412 ⟿ APPLICATION_ID,
                413 ⟿ DB_CONFIGURATION_PARMS?,
                414 ⟿ BIND_PARAMETERS?,
                415 ⟿ STMT_ACCESS_PLAN+) >

<! ELEMENT APPLICATION_EXPLAIN_DATA (
                COLLECTION_ID?, VERSION?, DBRM?) >
<! ELEMENT DB_CONFIGURATION_PARMS (ITEM+) >
<! ELEMENT BIND_pARAMETERS (BIND_TIME, OPTIMIZATION_PARAMETERS?, ITE
```

```
M*) >
<! ELEMENT OPTIMIZATION_PARAMETERS (ITEM*) >
<!--
**************************************************
<!-- A statement access plan contains EXPLAIN information and stati
stics for    -->
<!-- one SQL statement.                          -->
<!--
**************************************************
<! ELEMENT STMT_ACCESS_PLAN (STMT_PROPERTIES?, SQL_TEXT,
                              GRAPH_NODES, GRAPH_ARCS, OBJECT_S
TATS+) >
<! ELEMENT STMT_PROPERTIES ( COST?, ITEM* ) >
<! ELEMENT SQL_TEXT (ORIGINAL_SQL, OPTIMIZED_SQL?) >
<!--
**************************************************
<!-- GRAPH NODES represents all nodes of the access plan and each no
des    -->
<!-- information. Graph Arcs is a paired list of the ID of the p
arent Node    -->
```

FIG. 5D

```
<!-- and its child node.   The optional SOFT_ARC boolean indicator
 -->
<!-- denotes if this is a second pair for the same parent, used to
r example  -->
<!-- for common subexpressions in UNO
 -->
<!-- ***********************************************************
 -->
<!ELEMENT GRAPH_NODES  (NODE) + >
<!ELEMENT GRAPH_ARCS  (FROM_NODE_ID, TO_NODE_ID, SOFT_ARC?) * >
<!ELEMENT SOFT_ARC EMPTY >
<!ATTLIST SOFT_ARC_BOOL  (TRUE | FALSE ) #REQUIRED>     ~ 440
<!-- ***********************************************************
 -->
<!-- A node is any node in the graph which can correspond to
 -->
<!-- an operator, a table or an index.
 -->
<!-- ***********************************************************
 -->
<!ELEMENT NODE (NAME, (OPERATOR | OBJECT) ) >           ~ 420
<!-- ID IS A BUILT IN TYPE THAT GUARANTEES UNIQUENESS -->
```

FIG. 5E

```
<! ATTLIST NODE NODE_ID ID #REQUIRED >
<! ATTLIST NODE TYPE (TBSCAN | RETURN | SORT | IXSCAN | MSJOIN | NXS
CAN | NLJOIN        | STJOIN | HBJOIN | HSJOIN | UNION | IOA | IXAND |
TEMP | TABLE | INDEX | OTHER ) #REQUIRED >

<!-- ******************************************** -->
<!-- An operator corresponds to a node representing an access step -->
<!-- of an access plan.                           -->
<!-- An operator has properties that represent the cumulative effe -->
<!-- ct of all                                    -->
<!-- operations thus far.                         -->
<!-- ******************************************** -->
<! ELEMENT OPERATOR ( PROPERTIES?, ARGUMENTS?, SUGGESTIONS? ) >
<! ELEMENT PROPERTIES ( ( CATEGORY_NAME?, ( ITEM | TABLE_LIST | P_T
EXT)+ )+ ) >
<! ATTLIST PROPERTIES DETAILS (OVERVIEW | DETAILED | DEVELOPER) #REQ
UIRED >
```

FIG. 5F

```
<!ELEMENT ITEM ( (NAME, VALUE+)+ ) >
<!ELEMENT TABLE_LIST ( (COL_HEADER, VALUE+)+ ) >

<!-- ************************************************** -->
<!-- Each OBJECT represents a table or index within the SQL statement -->
<!-- -->
<!-- An OBJECT is a drawable node. It's id must be unique. -->
<!-- -->
<!-- ************************************************** -->
<!ELEMENT OBJECT ( SCHEMA, OWNER ) >

<!-- ************ -->
<!-- Representation of the bind time statistics -->
<!-- -->
<!-- ************ -->
<!ELEMENT OBJECT_STATS ( TABLESPACE+, FUNCTION* ) >
<!ELEMENT TABLESPACE (SCHEMA,NAME, (C,V)*, TABLE+) >
```

```
<! ELEMENT TABLE (SCHEMS, NAME, OWNER, (C,V) *, COLUMN_LIST,
                  INDEX_LIST?) >

<! ELEMENT COLUMN_LIST (COLUMN_STATS+) >
<! ELEMENT COLUMN_STATS (NAME, (C,V) *, DISTRIBUTION STATS?) >
<! ELEMENT DISTRIBUTION_STATS ( FREQUENCY_STATS?, HISTOGRAM_STATS? ) >
<! ELEMENT FREQUENCY_STATS ( STATISTIC+ ) >
<! ELEMENT HISTOGRAM_STATS ( STATISTIC+ ) >
<! ELEMENT INDEX_LIST (INDEX_STATS*) >
<! ELEMENT INDEX_STATS (SCHEMA, NAME, OWNER, (C,V) * INDEX_COL+) >
<! ELEMENT INDEX_COL (NAME, SEQUENCE, POSITION_IN_INDEX, POSITION_IN_
TABLE?) >
<! ELEMENT SEQUENCE EMPTY >
<! ATTLIST SEQUENCE SEQ (ASCENDING | DESCENDING) #REQUIRED >
<!--    Shared elements    -->
<! ELEMENT COST (SIMPLE_COST | CUM_COST ) >
<! ELEMENT SIMPLE_COST (CPU_COST, SERVICE_UNIT_COST?, COST_CATEGORY?,
  CATEGORY_REASON?) >
<! ELEMENT CUM_COST ( COST_BREAKDOWN , RE_ACCESS_COST?, FIRST_ROW_CO
ST? ) >
<! ELEMENT RE_ACCESS_COST ( COST_BREAKDOWN ) >
<! ELEMENT COST_BREAKDOWN ( TOTAL_COST?, CPU_COST?, IO_COST, COMMUN
ICATION_COST?,
                            SHIP_COST?) >
```

FIG. 5H

```
<!ELEMENT STATISTIC (VALUE, COUNT) >
<!ELEMENT C (#PCDATA) >
<!ELEMENT V (#PCDATA) >
<!ELEMENT ARGUMENTS (ITEM*) >
<!-- Low level elements -->
<!ELEMENT APP_TYPE (#PCDATA) >
<!ELEMENT BIND_TIME (#PCDATA) >
<!ELEMENT CATEGORY_REASON (#PCDATA) >
<!ELEMENT CATEGORY_NAME (#PCDATA) >
<!ELEMENT COL_HEADER (#PCDATA) >
<!ELEMENT COLLECTION_ID (#PCDATA) >
<!ELEMENT COST_CATEGORY (#PCDATA) >
<!ELEMENT FROM_NODE_ID (#PCDATA) >
<!ELEMENT FUNCTION (#PCDATA) >
<!ELEMENT TO_NODE_ID (#PCDATA) >
<!ELEMENT COUNT (#PCDATA) >
<!ELEMENT COMMUNICATION_COST (#PCDATA) >
<!ELEMENT CPU_COST (#PCDATA) >
<!ELEMENT DBRM (#PCDATA) >
<!ELEMENT FIRST_ROW_COST (#PCDATA) >
<!ELEMENT IO_COST (#PCDATA) >
```

FIG. 5I

```
<!ELEMENT HEADER (#PCDATA) >
<!ELEMENT P_TEXT (#PCDATA) >
<!ELEMENT NAME (#PCDATA) >
<!ELEMENT OPTIMIZED_SQL (#PCDATA) >
<!ELEMENT ORIGINAL_SQL (#PCDATA) >
<!ELEMENT OWNER (#PCDATA) >
<!ELEMENT POSITION_IN_INDEX (#PCDATA) >
<!ELEMENT POSITION_IN_TABLE (#PCDATA) >
<!ELEMENT QUERY (#PCDATA) >
<!ELEMENT SCHEMA (#PCDATA) >
<!ELEMENT SHIP_COST (#PCDATA) >
<!ELEMENT SERVICE_UNIT_COST (#PCDATA) >
<!ELEMENT SUGGESTIONS (#PCDATA) >
<!ELEMENT TOTAL_COST (#PCDATA) >
<!ELEMENT VALUE ( #PCDATA) >
<!ELEMENT VERSION (# PCDATA) >
```

Main routine:
//input: plan_root = pointer to the root of the plan graph
//output: XML file containing plan as XML Create XML header for environment, query-, and plan-wide aspects, such as:
    Application_id
    Configuration parameters
    Bind parameters
    Original SQL statement
    Optimized SQL statement
    Best plan's final properties
Create_XML (plan_root);
Amass XML file from:
    XML header
    Node XML area
    Arc XML area
    Statistics XML area
Return (XML file);

Subroutine create_XML (plan):
//input: plan = pointer to a node in the plan graph
//output: return code
//byproduct: XML text places in various XML areas (Nodes, Arcs, Statistics)

FIG. 6B

```
If plan->visited == true, return;        //avoids loops when graphs are recursive
Set plan->visited = true;                //bread crumbs to prevent re-visiting node
switch (plan->opcode)      //generate operator-specific XML for this node in Node XML area
{
    case NLJOIN: create XML for NLJOIN operator
    case MSJOIN: create XML for MSJOIN operator
    case HSJOIN: create XML for HSJOIN operator
    ...
    case IXSCAN: create XML for IXSCAN operator
    case TBSCAN: create XML for TBSCAN operator
    //end of switch
} if children (plan) > 0      //if this operator/object type has inputs (children)
{
    for (i = 0; i < children (plan); i++)    // for each child
    {
        create_XML(plan->child [ i ]);            //recursively create XML for child
        create_XML for arc (plan, child [ i ] )   //create XML for arc to child in Arc XML area
    }

//end of if operator has inputs
}
```

```
else            //create XML for statistics of base table in Statistics XML area
{
    create XML for statistics of base table T
    for each column C in T:
    {
        create XML for statistics of column C
        if distribution statistics exist for column C
            create XML for distribution statistics of column C
    }
    for each index I of T:
    {
        create XML for statistics of index I
    }
}   //end creating XML for statistics    //end of create_XML (return error if any errors)
return (return code);
```

```
< ? xml version="1.0" ? >
< ! - - Date last updated: 12/06/1999

< ! - - Example Explain XML for a SELECT sql item.
< ! DOCTYPE EXPLAIN REPORT (View Source for full doctype. . . ) >
< EXPLAIN REPORT PLATFORM="OS390" PRODUCT_VERSION="6.0" >
< APPLICATION_EXPLAIN_DATA >
  - < APPLICATION_ID >
      < APP_TYPE > PLAN < /APP_TYPE >
      < NAME > DEMOPLAN < /NAME >
      < OWNER > ADMF007 < /OWNER >
      < DBRM > DEMODBRM < /DBRM >
    < /APPLICATION_ID >
  - < DB_CONFIGURATION_PARMS >
    - < ITEM >
        < NAME > CPU < /NAME >
        < VALUE > 3390 < /VALUE >
      < /ITEM >
    - < ITEM >
        < NAME > DISK < /NAME >
        < VALUE > ROUND < /VALUE >
      < /ITEM >
```

FIG. 7B

```
</DB_CONFIGURATION_PARMS>
-<BIND_PARAMETERS>
    <BIND_TIME> 1999-06-28 </BIND_TIME>
  </BIND_PARAMETERS>
-<STMT_ACCESS_PLAN>
-<STMT_PROPERTIES>
  -<COST>
    -<SIMPLE_COST>
      <CPU_COST> 191 </CPU_COST>
      <SERVICE_UNIT_COST> 59 </SERVICE_UNIT_COST>
      <COST_CATEGORY> B </COST_CATEGORY>
      <CATEGORY_REASON>Table Cardinality</CATEGORY_REASON>
    -</SIMPLE_COST>
  </COST>
</STMT_PROPERTIES>
-<SQL_TEXT>
    <ORIGINAL_SQL> SELECT SALARY FROM EMPTABL WHERE SALARY = 200 OR SALARY = 50000 </ORIGINAL_SQL>
    <OPTIMIZED_SQL> SELECT SALARY FROM EMPTABL WHERE SALARY IN (200, 50000) </OPTIMIZED_SQL>
  </SQL_TEXT>
```

FIG. 7C

```
- < GRAPH_NODES >
  - < NODE NODE_ID="NODE1" TYPE="RETURN" >
      < NAME > SELECT < /NAME >
    - < OPERATOR >
      - < PROPERTIES DETAILS="OVERVIEW" >
          < CATEGORY_NAME > RELATIONAL < /CATEGORY_NAME >
        - < ITEM >
            < NAME > COST < /NAME >
            < VALUE > 191 ms < /VALUE >
            < NAME > Data Sharing Group < /NAME >
            < VALUE > V161A < /VALUE >
          < /ITEM >
        < /PROPERTIES >
      < /OPERATOR >
    < /NODE >
  - < NODE NODE_ID="NODE2" TYPE="IXSCAN" >
      < NAME > IXSCAN < /NAME >
    - < OPERATOR >
      - < PROPERTIES DETAILS="OVERVIEW" >
          < CATEGORY_NAME > RELATIONAL < /CATEGORY_NAME >
        - < ITEM >
```

510

```
< NAME > MATCHCOLS < /NAME >
< VALUE > 2 < /VALUE >
< NAME > INDEXONLY < /NAME >
< VALUE > Y < /VALUE >
   < /ITEM >
  < /PROPERTIES >
 < /OPERATOR >
< /NODE >
- < NODE NODE ID="NODE3" TYPE="INDEX" >
  < NAME > IDXD1 < /NAME >
 - < OBJECT >
    < SCHEMA > ADMF007 < /SCHEMA >
    < OWNER > ADMF007 < /OWNER >
  < /OBJECT >
 < /NODE >
- < NODE NODE ID="NODE4" TYPE="TABLE" >
  < NAME > EMPTABL < /NAME >
 - < OBJECT >
    < SCHEMA > ADMF007 < /SCHEMA >
    < OWNER > ADMF007 < /OWNER >
  < /OBJECT >
 < /NODE >
```

FIG. 7D

```
< /GRAPH_NODES >
- < GRAPH_ARCS >
- < GRAPH_ARCS >
   < FROM_NODE_ID > NODE1 < /FROM_NODE_ID >
   < TO_NODE_ID > NODE2 < /TO_NODE_ID >
   < FROM_NODE_ID > NODE2 < /FROM_NODE_ID >
   < TO_NODE_ID > NODE3 < /TO_NODE_ID >
   < FROM_NODE_ID > NODE3 < /FROM_NODE_ID >
   < TO_NODE_ID > NODE4 < /TO_NODE_ID >
 </GRAPH_ARCS >
- < OBJECT_STATS >
   < TABLESPACE >
     < SCHEMA > ADMF007 < /SCHEMA >
     < NAME > TBSP1 < /NAME >
     < C > TYPE < /C >
     < V > T < /V >
     < C > CARDF < /C >
     < V > 1345 < /V >
     < C > COLCOUNT < /C >
     < V > 3 < /V >
     < C > RECLENGTH < /C >
```

```
< V > 38 < /N >
< C > NPAGES < /C >
< V > 134 < /N >
< C > DBNAME < /C >
< V > DBDATA1 < /N >
< C > TSNAME < /C >
< V > TSP1D1 < /N >
- < TABLE >
    < SCHEMA > ADMF007 < /SCHEMA >
    < NAME > EMPTABL < /NAME >
    < OWNER > ADMF007 < /OWNER >
    < C > CARDF < /C >
    < V > -1 < /N >
    < C > NUMBER OF COLUMNS < /C >
    < V > 4 < /N >
  - < COLUMN_LIST >
    - < COLUMN_STATS >
        < NAME > MGRNAME < /NAME >
        < C > COLNO < /C >
        < V > 1 < /N >
        < C > COLTYPE < /C >
        < V > CHAR < /N >
```

FIG. 7F

```
            < C > LENGTH < /C >
            < V > 20 < /V >
            < C > NULLS < /C >
            < V > N < /V >
            < C > COLCARDF < /C >
            < V > 1345 < /V >
        < /COLUMN_STATS >
      - < COLUMN_STATS >
            < NAME > DEPTNAME < /NAME >
            < C > COLNO < /C >
            < V > 2 < /V >
            < C > COLTYPE < /C >
            < V > CHAR < /V >
            < C > LENGTH < /C >
            < V > 5 < /V >
            < C > NULLS < /C >
            < V > Y < /V >
            < C > COLCARDF < /C >
            < V > 150 < /V >
        < /COLUMN_STATS >
      - < COLUMN_STATS >
```

FIG. 7G

```
< NAME > SALARY < /NAME >
< C > COLNO < /C >
< V > 3 < /V >
< C > COLTYPE < /C >
< V > DECIMAL < /V >
< C > LENGTH < /C >
< V > 11 < /V >
< C > SCALE < /C >
< V > 2 < /V >
< C > NULLS < /C >
< V > Y < /V >
< C > COLCARDF < /C >
< V > 258 < /V >
< /COLUMN_STATS >
< /COLUMN_LIST >
< ! - - Index names and example statistics.
< ! - - All table indexes are listed.
- < INDEX_LIST >
- < INDEX_STATS >
< ! - - Index name
< SCHEMA > ADMF007 < /SCHEMA >
```

FIG. 7H

```
< NAME > IDX_MGR1 < /NAME >
< OWNER > ADMF007 < /OWNER >
<!-- Example index statistics
< C > UNIQUERULE < /C >
< V > P < /V >
< C > COLCOUNT < /C >
< V > 2 < /V >
< C > CLUSTERING < /C >
< V > Y < /V >
< C > BPOOL < /C >
< V > BP1 < /V >
< C > CLUSTERRATIOF < /C >
< V > 100 < /V >
< C > FREEPAGE < /C >
< V > 10 < /V >
< C > PCTFREE < /C >
< V > 10 < /V >
< C > GBPCACHE < /C >
< V > C < /V >
< C > CARDF < /C >
< V > 1345 < /V >
< C > NLEVELS < /C >
< V > 3 < /V >
```

FIG. 7I

```
< C > NLEAF < /C >
< V > 122 < /V >
<!-- index column names and example statistics
-->
-< INDEX_COL >
    < NAME > DEPTNAME < /NAME >
    < SEQUENCE SEQ="ASCENDING" />
    < POSITION IN INDEX > 1 < /POSITION IN INDEX >
    < POSITION_IN_TABLE > 2 < /POSITION_IN_TABLE >
  < /INDEX_COL >
-< INDEX_COL >
    < NAME > MGRNAME < /NAME >
    < SEQUENCE SEQ="DESCENDING" />
    < POSITION IN INDEX > 2 < /POSITION IN INDEX >
    < POSITION_IN_TABLE > 1 < /POSITION_IN_TABLE >
  < /INDEX_COL >
< /INDEX_STATS >
-< INDEX_STATS >
    <!-- index name -->
    < SCHEMA > ADMF007 < /SCHEMA >
    < NAME > IDXD2 < /NAME >
```

FIG. 7J

```
< OWNER > ADMF007 < /OWNER >
<! - - Example index statistics           - - >
< C > UNIQUERULE < /C >
< V > N < /V >
< C > COLCOUNT < /C >
< V > 1 < /V >
< C > CLUSTERING < /C >
< V > N < /V >
< C > BPOOL < /C >
< V > BP2 < /V >
< C > CLUSTERRATIOF < /C >
< V > 74 < /V >
< C > FREEPAGE < /C >
< V > 10 < /V >
< C > PCTFREE < /C >
< V > 5 < /V >
< C > GBPCACHE < /C >
< V > C < /V >
< C > CARDF < /C >
< V > 258 < /V >
< C > NLEVELS < /C >
< V > 3 < /V >
< C > NLEAF < /C >
```

FIG. 7K

```
< V > 88 < /V >
<!-- Index column names and example statistics -->
- < INDEX_COL >
  < INDEX_COL >
    < NAME > SALARY < /NAME >
    < SEQUENCE SEQ="ASCENDING" />
    < POSITION_IN_INDEX > 1 < /POSITION_IN_INDEX >
    < POSITION_IN_TABLE > 3 < /POSITION_IN_TABLE >
  < /INDEX_COL >
  < /INDEX_STATS >
< /INDEX_LIST >
< /TABLE >
< /TABLESPACE >
< /OBJECT_STATS >
< /STMT_ACCESS_PLAN >
< /APPLICATION_EXPLAIN_DATA >
< /EXPLAIN_REPORT >
```

FIG. 7L

PLATFORM-INDEPENDENT METHOD AND SYSTEM FOR GRAPHICALLY PRESENTING THE EVALUATION OF A QUERY IN A DATABASE MANAGEMENT SYSTEM

FIELD OF THE INVENTION

The present invention relates generally to database management systems and, more particularly, to a generic, platform independent, and extensible technique for graphically presenting the evaluation of a query in a database management system.

BACKGROUND OF THE INVENTION

Information is frequently stored in computer processing systems in the form of a relational database. A relational database stores information as a collection of tables having interrelated columns and rows. A relational database management system (RDBMS) provides a user interface to store and retrieve the information and provides a query methodology that permits table operations to be performed on the data. One such query methodology is the Structure Query Language (SQL) interface, which permits users to formulate operations on the data tables either interactively, or through batch file processing, or embedded in host languages such as C, COBOL, and the like.

In general, SQL provides table operations with which users can request database information. The table operations are specified in SQL statements or queries. An example of an SQL statement or query is provided below in Table 1:

TABLE 1

| SELECT | Mgrtabl.Name |
|---|---|
| FROM | Emptabl, Mgrtabl, Dbatabl |
| WHERE | Emptabl.Salary=Dbatabl.Salary AND |
|  | Emptabl.Dept=Dbatabl.Dept |

One of ordinary skill in the art will understand that "Mgrtabl.Name" indicates a Name column for Table Mgrtabl. Depending on the RDBMS platform, SQL statements will vary because the RDBMS platforms are defined differently and/or may offer different functionality.

While a query allows the user to specify the data desired, it does not detail how the data will be retrieved from the tables. In general, there may be several ways to retrieve the data that answers a given query. Accordingly, a query optimizer is utilized in the RDBMS to determine the most cost-effective way to retrieve the data.

FIG. 1 is a high-level block diagram of query processing in a query compiler that could be used with the present invention. As is shown, an input SQL query 300, which can be an actual query or some other command, is typically rewritten by a parser 310 into a RDBMS internal representation, which can then be converted into a query graph model (QGM) 320. Conceptually, the QGM 320 is a high-level, graphical representation of a statement, such as the input query 300, in which boxes represent relational operations and arcs connecting the boxes represent quantifiers that reference tables. It should be noted that not every query optimizer uses the QGM 320 to represent a statement. Other RDBMS platforms might, for instance, convert the input query 300 into a proprietary format different from a QGM 320. Nevertheless, as will be discussed below, the format of the RDBMS internal representation is not material to the present invention. Thus, for purposes of this discussion, the QGM 320 is illustrative rather than limiting.

The internal representation of the input query 300, in this case the QGM 320, undergoes various refinements during query processing. For instance, Query Global Semantics 330 and Query Rewrite Transform 340 are two typical processes that refine the QGM 320. At each stage of query processing, the evolving QGM 320 represents a transitional statement or plan (referred to as "QGM transition plans"), which can be written to a query EXPLAIN table 350, so that a developer can evaluate the QGM transition plans 320 at intermediary stages of query processing.

After the QGM 320 is refined, cost-based plan optimization 360 is performed whereby the QGM 320 is graphically traversed and a plurality of query execution plans (QEPs) are generated. The QEPs represent alternative ways of processing the data requested in the input query 300. Each QEP is compared to determine which of them is the most cost-efficient. The most cost-efficient query plan is referred to as the best QEP 370 or BQEP. The cost-based optimization process 360 can be performed using a number of different techniques, as is well known to one skilled in the art. For purposes of this discussion, however, the method utilized for cost-based optimization 360 is not material, and therefore, requires no further elaboration. After the BQEP 370 is selected, it is further refined by a threaded code generator 380. The threaded code generator 380 creates a plan section 390 of executable code for each input SQL statement 300. The plan section 390 is then executed by the RDBMS at run time.

FIG. 2 illustrates a graphical representation of the BQEP 10 of the query in Table 1 above. As is shown, the BQEP 10 can be represented in a work-flow graph of operators, in which each node 12a–12k of the graph represents either a source database object, e.g. a table, containing rows and columns in an RDBMS (12g, 12j, 12k), or some operation to the data (12a–12f, 12h, 12i, 12j). Each arc of the graph 14a–14j represents the flow of data between two or more operations, or between an object and an operation. Thus, a path in this graph represents the flow of data from its raw form stored in the database to the finished form requested by the user in her query.

While the graphical representation in FIG. 2 is helpful to the user in visualizing and evaluating the access path of a query, unless specifically requested, the query optimizer does not generate a graphical representation of the BQEP or any other plan. Rather, the plan section (FIG. 1, item 390) is generated in a proprietary format of the RDBMS, which is typically not user readable. If requested by the user, the BQEP 370 can be written to one or more tables, collectively known as an EXPLAIN table (FIG. 1, item 380). Thus, in order to evaluate the BQEP, the user must analyze the EXPLAIN table 380. This can be a daunting task because the EXPLAIN table 380 is not an intuitive, i.e. user friendly, representation of the BQEP 370, especially if the BQEP 370 is complicated. Accordingly, evaluation of the BQEPs 370 based on the EXPLAIN table 380 is tedious and time consuming.

Moreover, while input queries 300 are typically written in SQL, the resulting plans, e.g., QGM transition plans, query execution plans and the BQEP 370, are platform dependent. The major database management system platforms supporting SQL, including DB2, SQL/DS, Oracle, Sybase, SQLbase, INFORMIX and CA-Openlngres (Ingres), each have their own enhancements, quirks and tricks, such that plans generated by each platform vary from one platform to the other based on platform specific formats. Therefore, any application that reads plans from different database management system platforms would be required to be customized in order to understand the plans. This type of maintenance is error-prone and unmanageable.

Accordingly, a need exists for a method and system for representing plans, including QGM transition plans and QEPs, in a graphical manner, such that the user can visualize the plans in a comprehensive manner. The method and system should be platform independent, so that plans generated by different database management system platforms can be presented to the user without regard to the system platform. The present invention addresses such a need.

SUMMARY OF THE INVENTION

A platform independent method and system for graphically representing a plan, including a query execution plan, for a query in a relational database management system is disclosed. The method includes receiving and processing an input query to form a plurality of plans, selecting at least one plan of the plurality of plans, and transforming the selected plan into a self-describing formatted file which is platform independent. The method further includes generating a graph representing the selected plan from the self-describing formatted file.

Through aspects of the present invention, any plan, including a best query execution plan for a query and QGM transition plans, generated from any RDBMS platform is represented as a self-describing formatted file, which is then used to generate a graph representing the plan. Because the self-describing formatted file is independent of the RDBMS platform, a graphing tool, which reads the self-describing formatted file, need not understand or differentiate between platforms. In essence, the RDBMS becomes transparent to the graphing tool. Thus, application software updates to the graphing tool in order to accommodate new database system platforms are eliminated. Moreover, because the present invention utilizes a self-describing file (i.e., extensible), nuances from each platform can be captured and conveyed to the graphing tool.

BRIEF DESCRIPTION OF THE DRAWINGS

FIG. 6 is an illustrative algorithm written in pseudo code, for generating an XML file from the query execution plan generated by the query compiler.

DETAILED DESCRIPTION

The present invention relates generally to database management systems and, more particularly, to a generic and extensible technique for capturing and saving a description of the BQEP in a platform-independent data exchange format, as well as, for graphically presenting the evaluation of a query in a database management system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
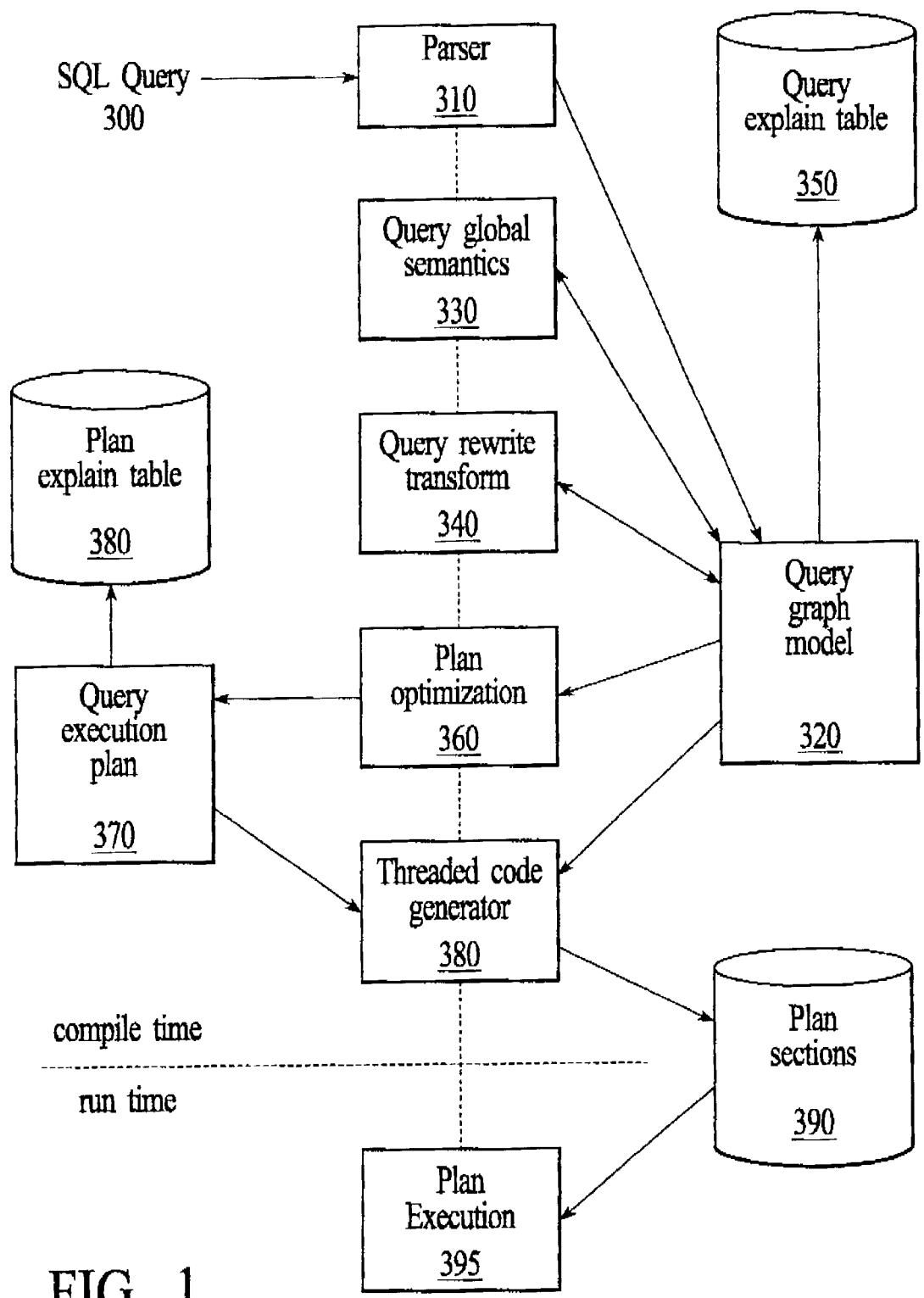
FIG. 1 illustrates a high-level block diagram of query processing in a query compiler.
Figure 2:
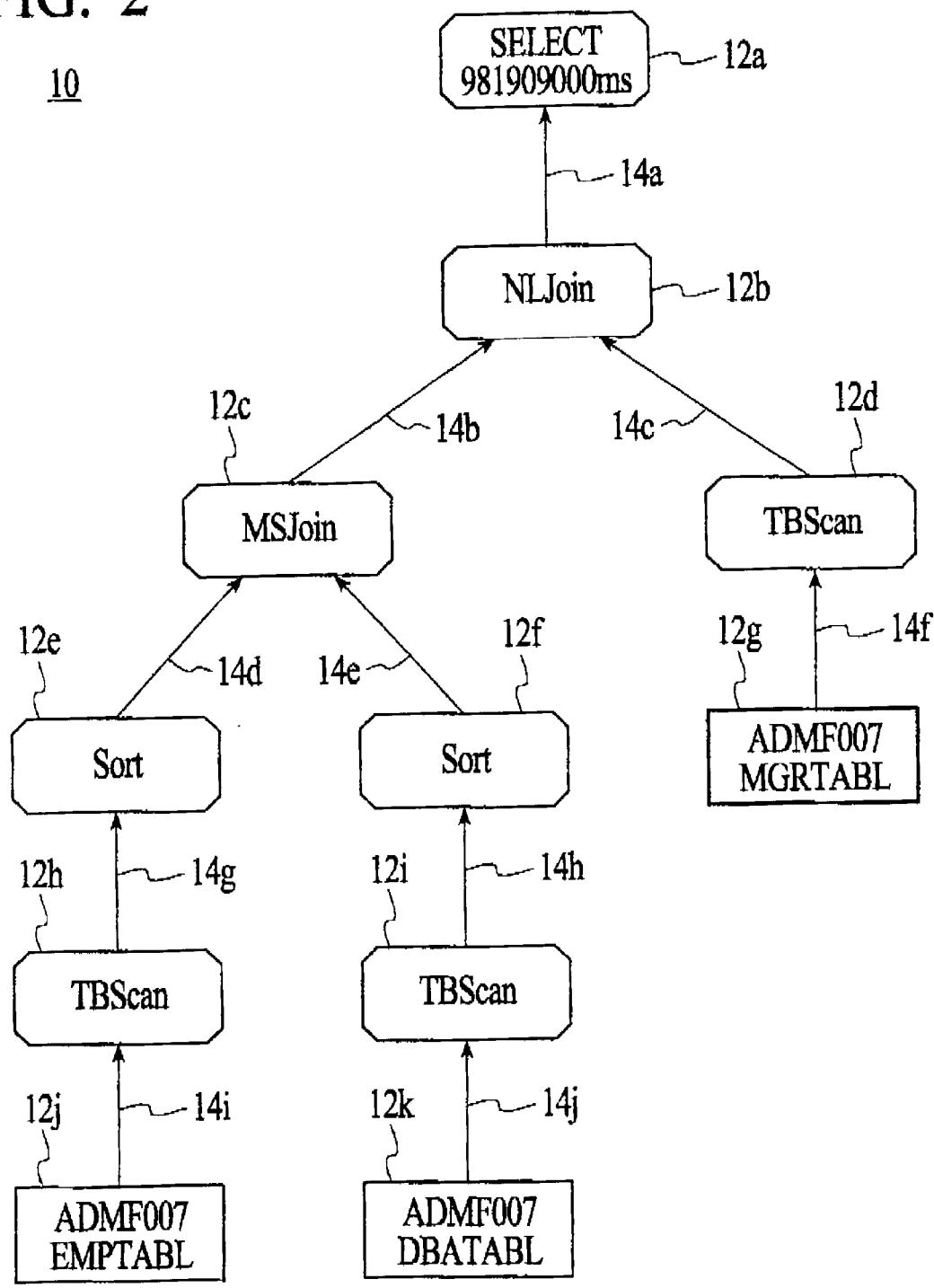
FIG. 2 illustrates a graphical representation of a query execution plan.
Figure 3:
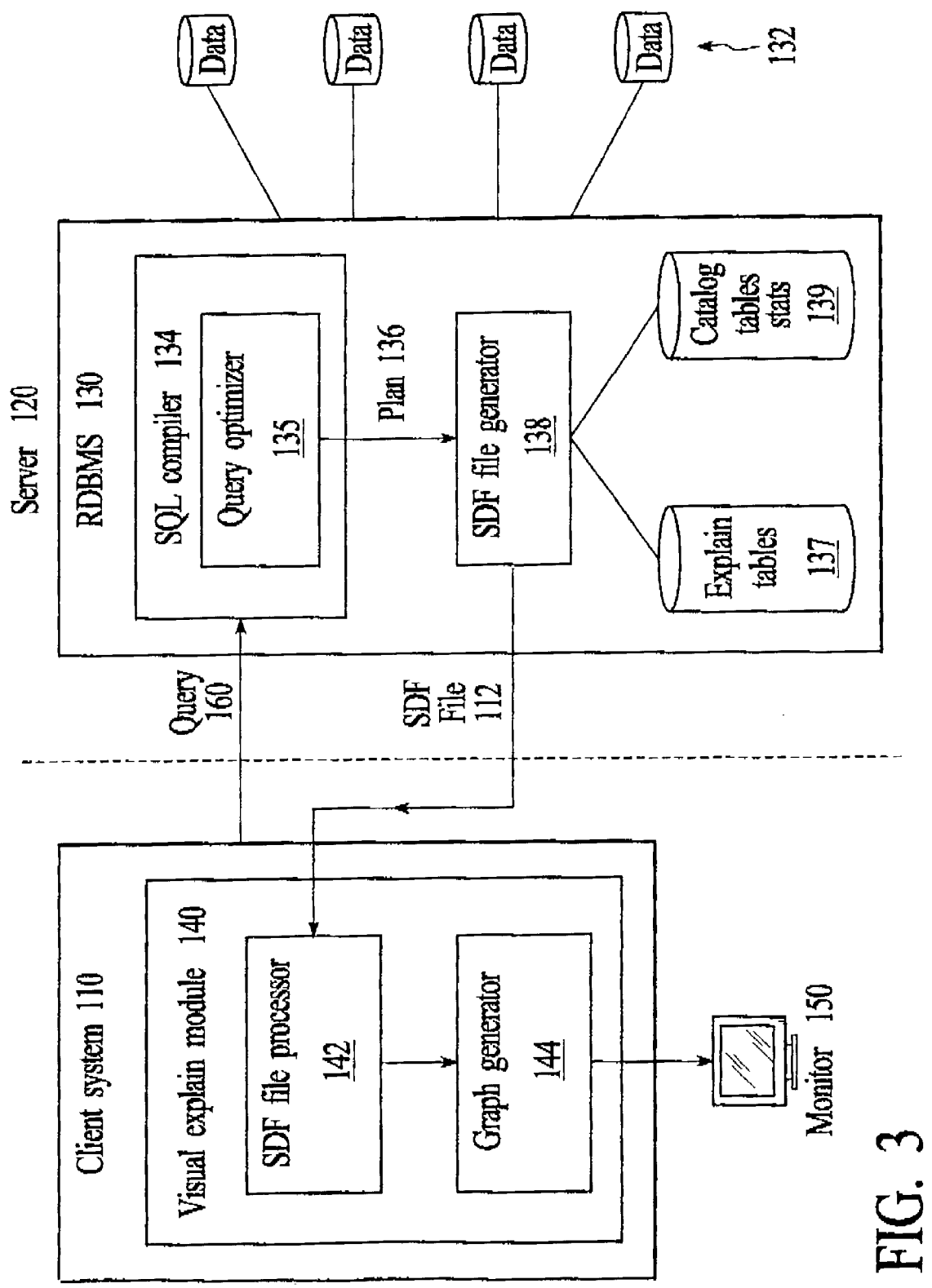
FIG. 3 is a block diagram of the system in accordance with a preferred embodiment of the present invention.

FIG. 3 is a schematic block diagram of a system 100 in accordance with a preferred embodiment of the present invention. The system 100 includes a client system 110 and a server system 120. Typically, the client system 110 is a workstation or computer, which is in communication with the server 120 via LAN or WAN (not shown), as is well known to one skilled in the art. Although only one client system 110 is depicted, one skilled in the art will readily appreciate that a plurality of client systems (not shown) are typically in communication with the server 120.

The server 120 includes a RDBMS 130 that manages access to data 132 stored in the relational database tables. The RDBMS 130 can be, for example, a DB2/390 system developed by International Business Machines, Corp., Armonk, N.Y. The RDBMS 130 includes an SQL compiler 134 that receives input queries 160 from client systems 110. The SQL compiler 134 includes a query optimizer 135 for evaluating the query 160 and producing a plurality of plans, including a BQEP 136. The SQL compiler 134 is coupled to a self-describing formatted file (SDF file) generator 138, which in turn is coupled to Explain Tables 137 and Catalog Tables and Statistics 139.

The client system 110 includes a graphing and display tool, such as a Visual Explain module 140, and a display monitor 150. The Visual Explain module 140 receives the SDF file 112 from the RDBMS 130 in response to its input query 160. The Visual Explain module 140 includes a SDF file processor 142, which analyzes the SDF file 112. The SDF file processor 142 is coupled to a graph generator 144, which is coupled to the client's display monitor 150.

Figure 4:
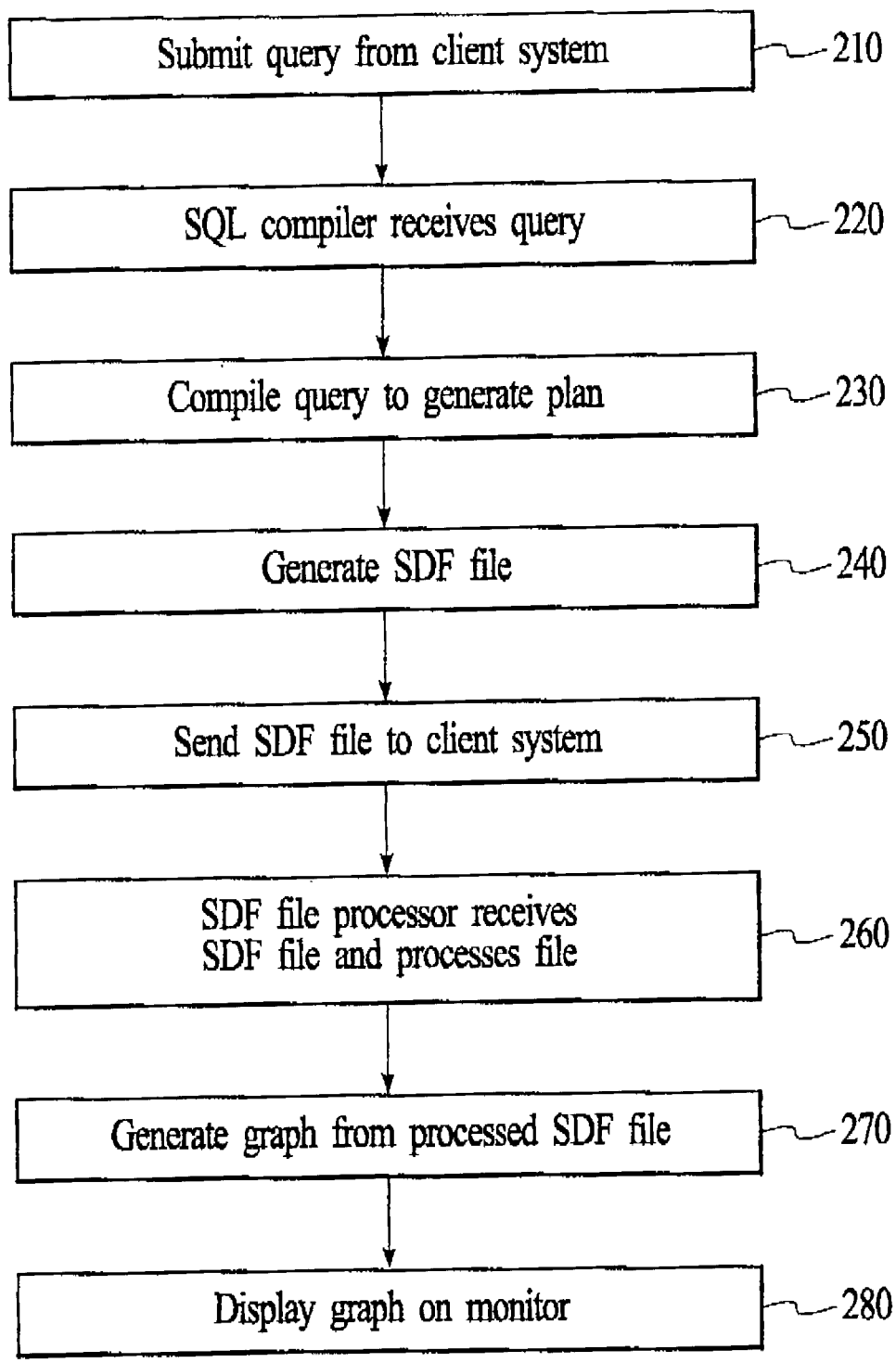
FIG. 4 is a flow chart illustrating the process of graphically representing a query execution plan in accordance with a preferred embodiment of the present invention.

To explain better the preferred embodiment of the present invention, please refer now to FIGS. 3 and 4. FIG. 4 is a high level flowchart illustrating a method 200 in accordance with the present invention. As is shown, the method starts with step 210, where the user submits an input query 160 to the RDBMS 130 for query processing. The input query 160 is typically written in SQL. The SQL compiler 134 in the RDBMS 30 receives the query 160 in step 220, and in step 230, compiles the query and generates a plurality of plans, including a BQEP 136 for the query 160. In this embodiment, the BQEP 136 is then passed to the SDF file generator 138, which generates a SDF file 112 describing a graphical representation of the BQEP 136, via step 240.

The SDF file 112 is then sent to the client system 110 in step 250, where it is received by the SDF file processor 142 in the Visual Explain module 140, via step 260. The SDF file processor 142 reads and interprets the SDF file 112 and instructs the graph generator 144 to build the graphical representation of the BQEP 136 embodied in the SDF file 112, via step 270. In the final step 280, the graph is displayed to the user on the client system's monitor 150.

In the description above, the plan 136 passed to the SDF file generator 138 is the best query execution plan.

Nonetheless, the present invention is not limited only to the best query execution plans. Rather, depending upon the desires of the user, other plans, such as QGM transition plans or QEPs which are not selected as the BQEP, could be passed from the optimizer 135 to the SDF file generator 138 and represented in an SDF file 112. Such information would be valuable to a developer designing the query optimizer 135 because then she could easily evaluate the plans generated at various stages of query processing.

In the preferred embodiment, the SDF file 112 is platform independent, that is, it is not written in the proprietary format particular to the RDBMS 130. Thus, when the SDF file 112 arrives at the client system 110, the Visual Explain module 140 has no idea, nor does it care, from which RDBMS platform 130 the SDF file 112 originated. In addition, the SDF file 112 is extensible so that it can describe the nuances presented by different RDBMS platforms.

In accordance with the preferred embodiment of the present invention, the SDF file 112 is preferably written in Extensible Markup Language (XML). XML is an open standard for describing data by means of tags that identify elements in a document and define what those elements contain. XML typically represents data of a hierarchical data structure ("tree structure"), i.e., data with a traditional direct parent-child relationship, where each child has a single parent. Thus, an XML document can be represented as a tree of elements.

XML is an extensible language because it allows the developer to define the tags. Thus, virtually any data item can be identified. While the tags are preferably defined in a document type definition (DTD), which can be embedded within an XML file or provided in a separate document, other document schema, such as XML schema, and RDF schema, could be utilized, as would be well known to those skilled in the art.

Figure 5:
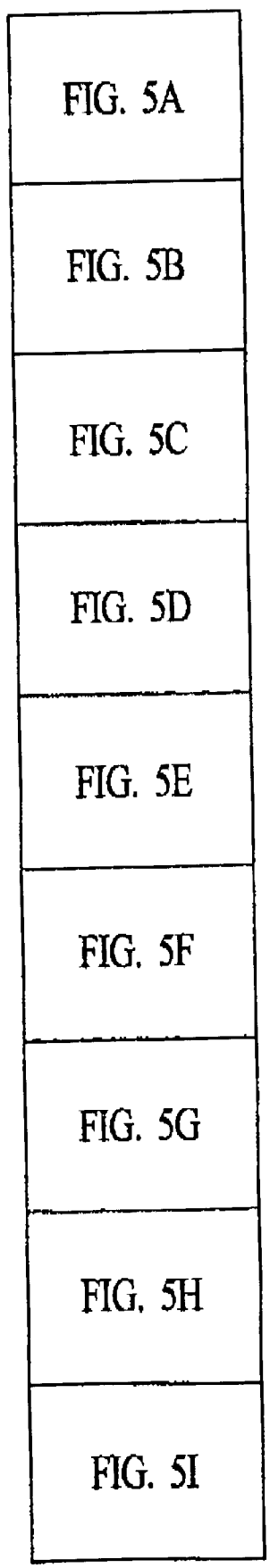
FIG. 5 is an illustrative definition type document in accordance with a preferred embodiment of the present invention.

FIG. 5 is an illustrative DTD that can be used with the present invention. As is shown, elements are defined as having one or more attributes. So, for example, the element "Application_Explain_Data" 410 is defined by its attributes "Application_ID" 412, "DB_Configuration_Parms?" 413, "Bind_Parameters?" 414, and "Stmt_Access_Plan+" 415, which are listed in parentheses following the element. Each attribute 412–415 can in turn have its own set of attributes.

According to the present invention, the DTD provides a fixed set of tags that define common elements, such as nodes and arcs, to facilitate the development of common tools for plans. As stated above, nodes can represent an operator or an object, such as a table or an index. Thus, the element "Node" is defined by its name and operator/object 420. Furthermore, within each node, detailed information about the node, such as table statistics, can be specified by XML tags 430 in the DTD. Thus, the detailed information is defined and associated with the node and is easily accessible if needed.

The DTD defines an element "Arc" 440 as a paired list of the identification of a parent node and its child node, and allows control over the direction of the arc. The arc represents the flow of data from the table to the user. So, for example, consider the XML data in Table 2:

TABLE 2

```
<node id=1> A </node>
<node id=2> K </node>
<node id=3> R </node>
```

TABLE 2-continued

```
<graph_arcs>
    <from_node_id>2</from_node_id>
    <to_node_id>1</to_node_id>
    <from_node_id>3</from_node_id>
    <to_node_id>1</to_node_id>
</graph_arcs>
```

The graphical representation would comprise three nodes (A, K and R), where nodes K and R are the children of node A.

As stated above, XML is an extensible language. The DTD can not only define the tags, but it can also specify whether the tags are fixed or open-ended, or some combination of the two. Thus, the DTD can accommodate evolving information about a plan, such as an execution plan. Furthermore, tags can be defined within the XML file, i.e. independent from the DTD. Such "self-describing" tags that are not explicitly specified in the DTD are treated simply as a label for the corresponding data. So, for instance, if the tag "cost" is not defined by a DTD, and the sequence "<cost>47.693</cost>" appears in the XML file, a display tool, such as the Visual Explain module 140, will simply use the tag string "cost" to label the number following it, and display:

Cost: 47.693

Utilizing a self-describing file, such as the XML file, provides flexibility and reduces maintenance efforts. For example, the problem of old versions of the application becoming obsolete and incompatible with newer versions of the application (i.e., version obsolescence) is virtually eliminated because whatever element is not defined by the DTD will still be displayed.

Accordingly, by describing the plan in XML, a standard extensible language can be utilized to capture the nuances of a plan produced by any database management system. Because this allows the Visual Explain module 140 to be platform independent, new database management system platforms can be accommodated without product (e.g., software) updates.

Figures 6, 6A, 6B, 6C:
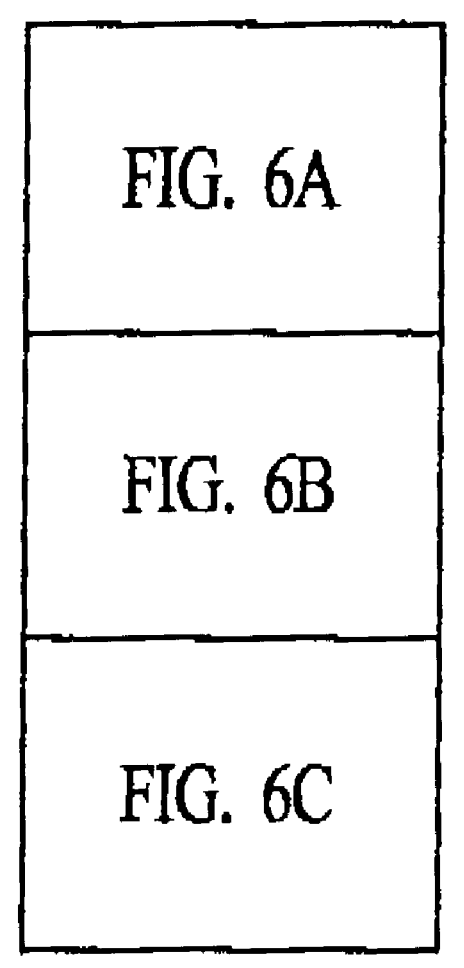

As stated above, in the preferred embodiment of the present invention, the XML file describing the plan is generated by the SDF file generator 138 in the RDBMS 130. Referring to FIG. 6, one computer-implemented program written in pseudo code is given for generating an XML file from the plan generated by the query optimizer 135. In general, the SDF file generator 138 analyzes the plan as a tree structure, traverses the tree structure and maps the plan operators to the XML using the definitions provided in the DTD.

Figure 7:
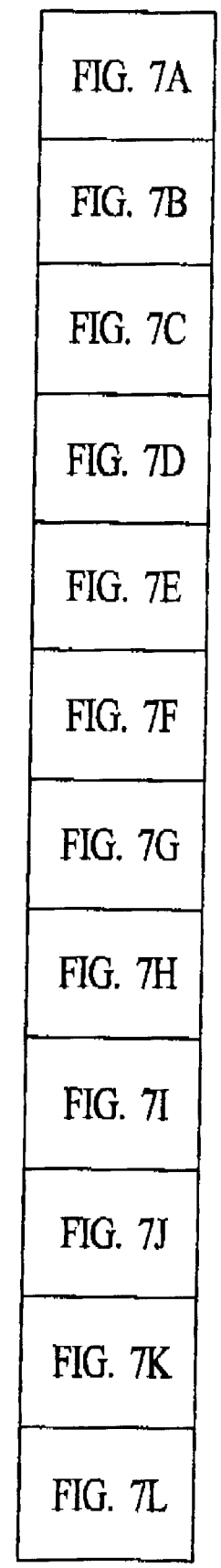
FIG. 7 is an illustrative XML file corresponding to a query execution plan for a query in accordance to a preferred embodiment of the present invention.

FIG. 7 is an XML file 500 representing a graphical presentation of a best query execution plan for a query in Table 3.

TABLE 3

SELECT SALARY FROM EMPTABL
WHERE SALARY = 200 OR SALARY = 50000

Figure 8:
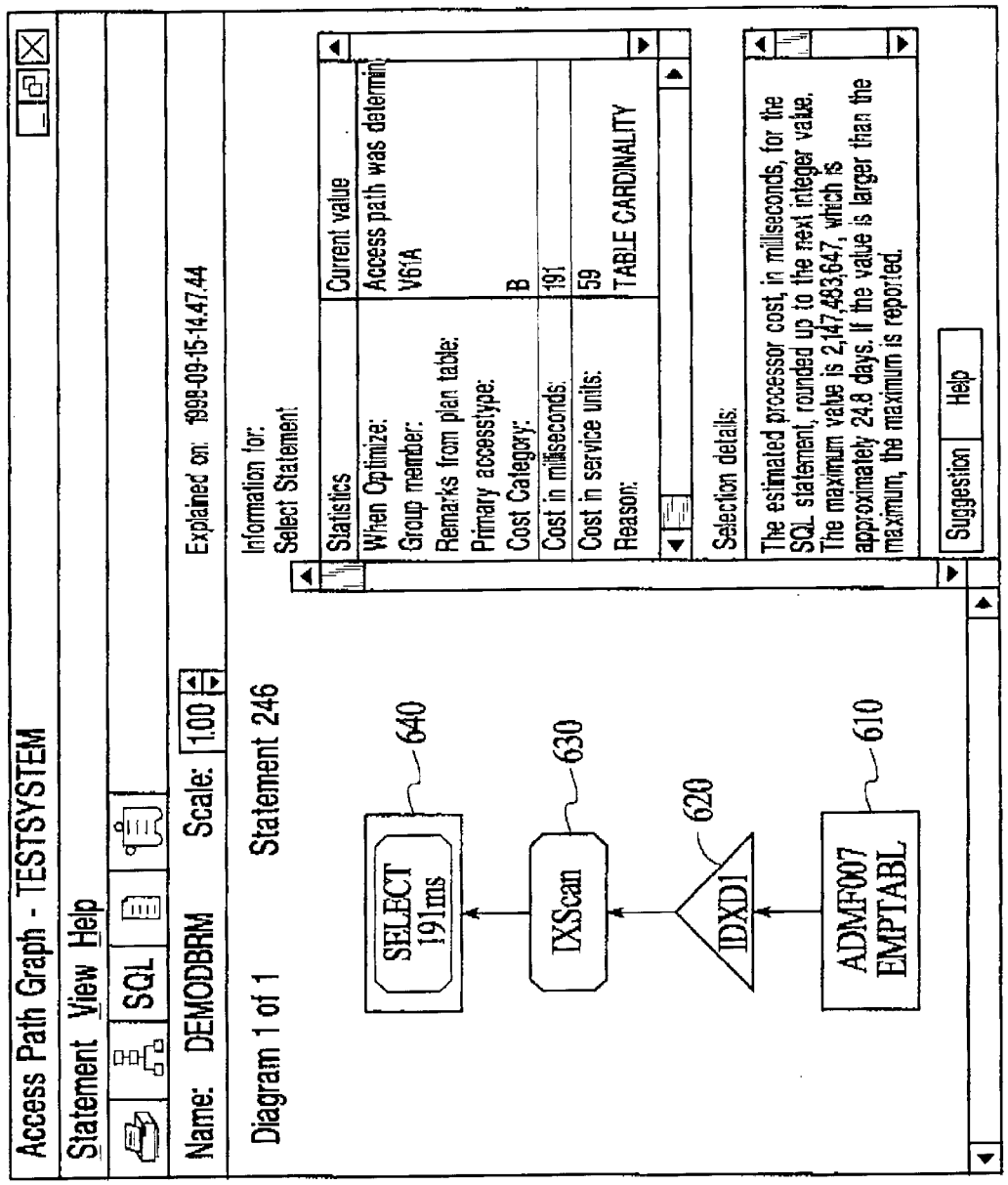
FIG. 8 illustrates the graphical representation of the XML file corresponding to the query execution plan for the query in accordance to a preferred embodiment of the present invention.

FIG. 8 is the associated graphical representation 600 of the best query execution plan for the query. As is seen in FIG. 7, four nodes 510 are defined in the XML file. Node Four 520 is a table (type) named "EMPTABL." Node Three 530 is an index type named "IDXD1." Both Nodes Three and Four are objects, while Nodes One and Two are operators. The XML file 500 further defines the arcs between the nodes at 540. Note that each node also contains nested information. For example, object type nodes (e.g., Node Three 530 and Four 520), include "schema" and "owner" information, while operator type nodes (e.g., Nodes One and Two 535), include property details, category name, and other item details.

The XML file processor (FIG. 3, 142) reads the XML file 500 and identifies all the tags. After validating the tags against the DTD, the XML file processor passes the data to the graph generator (FIG. 3, 144).

Referring now to FIG. 8, the resulting graph 600 generated from XML file 500 has four (4) nodes 610–640, where Node Four 610 is a named "EMPTABL," and Node Three 620, is named "IDXD1." Nodes One 640 and Two 630 are depicted as operators SELECT and IXScan, respectively. If the user were to select (e.g., "click") one of the nodes, the nested information provided in the XML file 500, for instance schema and owner information for Node 4 (520), would be displayed. In addition, object statistics (e.g., table or index statistics) are also nested within the graph 600 and available to the user.

Accordingly, through aspects of the present invention, XML is advantageously used as a lingua franca to describe a plan for a query generated from any RDBMS platform. Because the XML file is independent of the RDBMS platform, there is no need for the client system to understand or differentiate between platforms. In essence, the RDBMS becomes transparent to the client. Thus, application software updates to the client system in order to accommodate new database system platforms are unnecessary. Moreover, because the XML file is a self-describing document (i.e., extensible), nuances from each platform can be captured and conveyed to the client graphing and display tool (e.g., Visual Explain module) and incorporated into the graph displayed.

Although the present invention has been described in accordance with the embodiments shown, one of ordinary skill in the art will readily recognize that there could be variations to the embodiments and those variations would be within the spirit and scope of the present invention. For instance, the algorithm discussed for translating the plan into an XWL file is illustrative. One skilled in the art would readily recognize that other methods of translation are available, and those methods would fall within the scope of the present invention. Accordingly, many modifications may be made by one of ordinary skill in the art without departing from the spirit and scope of the appended claims.

What is claimed is:

1. A method for graphically representing a plan for an input query for a relational database management system comprising the steps of:
   a) receiving an input query;
   b) processing the input query to form a plurality of structured plans;
   c) selecting at least one structured plan of the plurality of structured plans;
   d) transforming the selected structured plan into a self-describing formatted file, wherein the self-describing formatted file is platform independent; and
   e) generating a graph representing the selected structured plan from the self-describing formatted file.

2. The method of claim 1, wherein the self-describing formatted file is an extensible markup language (XML) file.

3. The method of claim 2, wherein the transforming step (d) further includes:
   d1) providing a document schema to define the XML file; and
   d2) utilizing the document schema to translate the selected plan into the XML file.

4. The method of claim 3, wherein the utilizing step (d2) further includes:
   d2i) mapping the selected plan to the XML using the definitions provided in the document schema.

5. The method of claim 4, wherein the document schema is a description type document (DTD).

6. The method of claim 1, wherein the graph generating step (e) further includes:
   e1) reading the self-describing formatted file by a self-describing formatted file processor;
   e2) creating a plurality of nodes according to the self-describing formatted file; and
   e3) creating a plurality of arcs to connect the plurality of nodes according to the self-describing formatted file to form the graphical representation of the selected plan.

7. The method of claim 6, wherein the graph generating step (e) further includes:
   e4) collecting detailed information related to each node and associating the related information with each corresponding node, such that the related information is available if requested.

8. The method of claim 1, wherein the relational database management system is a UNIX based system.

9. The method of claim 1, wherein the relational database management system is a WINDOWS based system.

10. The method of claim 1, wherein steps (a)–(d) are performed by the relational database management system.

11. The method of claim 10, wherein step (e) is performed by a client system.

12. The method of claim 11, wherein the client system includes a monitor, the method further including:
   (f) displaying the graph on the monitor.

13. The method of claim 1, wherein the selected plan is a best query execution plan.

14. A computer readable medium containing programming instructions for graphically representing a plan for an input query for a relational database management system, the programming instructions for:
   a) receiving an input query;
   b) processing the input query to form a plurality of structured plans;
   c) selecting at least one structured plan of the plurality of structured plans;
   d) transforming the selected structured plan into a self-describing formatted file, wherein the self-describing formatted file is platform independent; and
   e) generating a graph representing the selected structured plan from the self-describing formatted file.

15. The computer readable medium of claim 14, wherein the self-describing formatted file is an extensible markup language (XML) file.

16. The computer readable medium of claim 15, wherein the transforming instruction (d) further includes:
   d1) providing document schema to define the XML file; and
   d2) utilizing the document schema to translate the selected plan into the XML file.

17. The computer readable medium of claim 16, wherein the utilizing instruction (d2) further includes:
   d2i) mapping the selected plan to the XML using the definitions provided in the document schema.

18. The computer readable medium of claim 17, wherein the document schema is a description type document (DTD).

19. The computer readable medium of claim 14, wherein the graph generating instruction (e) further includes:
   e1) reading the self-describing formatted file by a self-describing formatted file processor;
   e2) creating a plurality of nodes according to the self-describing formatted file; and
   e3) creating a plurality of arcs to connect the plurality of nodes according to the self-describing formatted file to form the graphical representation of the selected plan.

20. The computer readable medium of claim 19, wherein the graph generating instruction (e) further includes:
   e4) collecting detailed information related to each node and associating the related information with each corresponding node, such that the related information is available if requested.

21. The computer readable medium of claim 14, wherein the relational database management system is a UNIX based system.

22. The computer readable medium of claim 14, wherein the relational database management system is a WINDOWS based system.

23. The computer readable medium of claim 14, wherein instructions (a)–(d) are performed by the relational database management system.

24. The computer readable medium of claim 23, wherein instruction (e) is performed by a client system.

25. The computer readable medium of claim 24, wherein the client system includes a monitor, the computer readable medium further including instructions for:
   (f) displaying the graph on the monitor.

26. The computer readable medium of claim 14, wherein the selected plan is a best query execution plan.

27. A system for graphically representing a plan for an input query to a relational database management system (RDBMS), the system comprising:
   a query compiler in the RDBMS for processing the input query and generating a plurality of structured plans for the input query;
   means for selecting at least one structured plan of the plurality of structured plans;
   a self-describing formatted file generator coupled to the query optimizer for transforming the selected structured plan into a self-describing formatted file, wherein the self-describing formatted file is platform independent; and
   means for generating a graph representing the selected plan from the self-describing formatted file.

28. The system of claim 27, wherein the self-describing formatted file is an extensible markup language (XML) file.

29. The system of claim 28, wherein the means for generating the graph includes a Visual Explain module, the Visual Explain module further including an XML file processor coupled to a graph generator.

30. The system of claim 29, wherein the self-describing formatted file generator utilizes a document schema to transform the selected plan into the XML file.

31. The system of claim 30, wherein the XML file processor includes means for processing the XML file and means for instructing the graph generator to graph the XML file.

32. The system of claim 31, wherein the graph generator includes means for creating a plurality of nodes according to instructions from the XML file processor, and means for creating a plurality of arcs to connect the plurality of nodes to form the graphical representation of the selected plan.

33. The system of claim 30, wherein the document schema is a description type document (DTD).

34. The system of claim 27, wherein the relational database management system is a UNIX based system.

35. The system of claim 27, wherein the relational database management system is a WINDOWS based system.

36. The system of claim 27, wherein the system further includes a client system, wherein the client system includes the means for generating a graph.

37. The system of claim 36, wherein the client system includes a monitor coupled to the means for generating the graph for displaying the graph to a user.

38. A method for graphically representing a query execution plan for an input query for a relational database management system comprising the steps of:
   a) receiving an input query;
   b) compiling the input query to form a structured query execution plan;
   c) transforming the structured query execution plan into a file written in Extensible Markup Language (XML), wherein the XML file is platform independent;
   d) reading the XML file by an XML file processor;
   e) creating a plurality of nodes according to the XML file;
   f) collecting detailed information related to each node and associating the related information with each corresponding node, such that the related information is available if requested; and
   g) connecting the plurality of nodes with a plurality of arcs to generate a graph representing the query execution plan from the XML file.

39. The method of claim 38, wherein the relational database management system is a UNIX based operating system.

40. The method of claim 38, wherein steps (d)–(g) are performed by a client system.

41. The method of claim 40, wherein the client system includes a monitor, the method further including:
   (h) displaying the graph on the monitor.

42. The method of claim 38, wherein the query execution plan is the best query execution plan.

* * * * *